(12) United States Patent
Berlin et al.

(10) Patent No.: US 6,845,599 B2
(45) Date of Patent: Jan. 25, 2005

(54) METHOD OF MANUFACTURING A MULTI-LAYER PACKAGING LAMINATE AND PACKAGING LAMINATE OBTAINED BY THE METHOD

(75) Inventors: Mikael Berlin, Lund (SE); Mats Bentmar, Svedala (SE); Katarina Flemmer, Lund (SE)

(73) Assignee: Tetra Laval Holdings & Finance SA, Pully (CH)

(*) Notice: Subject to any disclaimer, the term of this patent is extended or adjusted under 35 U.S.C. 154(b) by 0 days.

(21) Appl. No.: 10/181,885

(22) PCT Filed: Jan. 25, 2001

(86) PCT No.: PCT/SE01/00140
§ 371 (c)(1),
(2), (4) Date: Jul. 24, 2002

(87) PCT Pub. No.: WO01/54828
PCT Pub. Date: Aug. 2, 2001

(65) Prior Publication Data
US 2003/0003197 A1 Jan. 2, 2003

(30) Foreign Application Priority Data
Jan. 26, 2000 (SE) .............................................. 0000233

(51) Int. Cl.⁷ .............................. B05D 1/30; B65B 3/02
(52) U.S. Cl. .................... 53/452; 427/411; 427/402; 428/35.4; 428/36.7; 428/336; 428/411.1
(58) Field of Search ................... 53/452, 464, 467; 428/411.1, 336, 35.4, 36.7; 427/402, 411

(56) References Cited
U.S. PATENT DOCUMENTS

| | | | |
|---|---|---|---|
| 2,761,419 A | * | 9/1956 | Mercier et al. ............. 118/412 |
| 3,325,335 A | | 6/1967 | Matensson |
| 3,941,643 A | | 3/1976 | Balla |
| 3,985,604 A | | 10/1976 | Balla |
| 4,017,247 A | | 4/1977 | Soukup et al. |
| 4,067,763 A | | 1/1978 | Mandersson |
| 4,143,190 A | | 3/1979 | Choinski |
| 4,256,797 A | | 3/1981 | Stamper et al. |
| 4,373,002 A | | 2/1983 | Petersen-Hoj |
| 4,495,016 A | | 1/1985 | Viberg et al. |
| 4,571,316 A | | 2/1986 | Naruse et al. |
| 4,580,392 A | | 4/1986 | Lagerstedt et al. |
| 4,657,614 A | | 4/1987 | Andersson |
| 4,755,412 A | | 7/1988 | Glans et al. |
| 4,814,043 A | | 3/1989 | Rausing et al. |
| 4,994,310 A | | 2/1991 | Frisk et al. |
| 5,133,999 A | | 7/1992 | Lofgren et al. |

(List continued on next page.)

FOREIGN PATENT DOCUMENTS

| | | |
|---|---|---|
| EP | 0 590 263 A2 | 4/1994 |
| EP | 0 930 530 A2 | 7/1999 |
| JP | 2000-70848 | 3/2000 |
| WO | 99/46121 | 9/1999 |

OTHER PUBLICATIONS

C. Zilg et al., "*Plastics and Rubber Nanocomposites Based Upon Layered Silicates*", Plastics Technology 2000, translated from Kunstsoffee 88 (1988) 10, pp. 1812–1820.

E. Gutoff, "*Premetered Coating*", Modern Coating and Drying Technology, pp. 117–122.

*Primary Examiner*—John Sipos
*Assistant Examiner*—Michelle Lopez
(74) *Attorney, Agent, or Firm*—Burns, Doane, Swecker & Mathis, L.L.P.

(57) ABSTRACT

A multi-layer packaging laminate is produced by simultaneously applying at least two wet coating layers to a substrate web (10) in a slide coater or curtain coater having a slide block (14) over which laminar flow streams of coating liquid flow to reach the substrate web. At least one layer is less than 20 μm thick (wet) and at least one layer has oxygen barrier or scavenger properties.

12 Claims, 1 Drawing Sheet

U.S. PATENT DOCUMENTS

| | | |
|---|---|---|
| 5,143,764 A | 9/1992 | Rosen |
| 5,162,066 A | 11/1992 | Martensson et al. |
| 5,332,458 A | 7/1994 | Wallick |
| 5,478,618 A | 12/1995 | Rosen |
| 5,670,214 A * | 9/1997 | Saito et al. ................. 427/402 |
| 5,834,079 A * | 11/1998 | Blinka et al. .............. 428/35.7 |
| 5,914,164 A * | 6/1999 | Ciocca et al. .............. 428/36.7 |
| 5,916,685 A * | 6/1999 | Frisk ......................... 428/446 |
| 5,969,029 A | 10/1999 | Kotani et al. |
| 5,989,724 A | 11/1999 | Wittosch et al. |
| 6,071,576 A | 6/2000 | Bentmar et al. |
| 6,312,778 B1 | 11/2001 | Sandell |
| 6,403,231 B1 * | 6/2002 | Mueller et al. .......... 428/474.4 |
| 6,458,438 B2 * | 10/2002 | Blinka et al. .............. 428/35.4 |
| 6,500,491 B2 * | 12/2002 | Tomaru et al. ............. 427/402 |
| 6,579,569 B2 * | 6/2003 | Bermel et al. .............. 427/402 |
| 6,607,786 B2 * | 8/2003 | Katagiri et al. ............. 427/402 |

* cited by examiner

METHOD OF MANUFACTURING A MULTI-LAYER PACKAGING LAMINATE AND PACKAGING LAMINATE OBTAINED BY THE METHOD

FIELD OF THE INVENTION

The present invention relates to methods for producing packaging laminates and to the use of said laminates in forming and filling packages.

BACKGROUND OF THE INVENTION

Packaging laminates generally comprise a substrate bearing one or more coating layers. The coating layers may, dependent upon their composition, be applied as molten plastics or may be applied wet, either in solution or as a dispersion in a carrier liquid, followed by drying. Until now, wet applied coatings have been applied singly with intermediate drying steps.

Wet coatings are also applied to substrates in the field of manufacturing photo papers. For this purpose, it is known to apply several wet layers simultaneously to a substrate using either a slide coater or a curtain coater.

SUMMARY OF THE INVENTION

We have now found that it is possible to employ such techniques in the manufacture of packaging laminates.

Accordingly, the present invention now provides a method of producing a multi-layer packaging laminate comprising a substrate bearing at least two superposed coating layers, which method comprises applying two or more wet coating layers to said substrate to provide wet superposed layers thereon and drying said layers.

Preferably, said wet coating layers include at least one layer from each of at least two categories selected from adhesive layers, gas barrier layers, distancing layers, oxygen scavenging layers and heat sealing layers. Most commonly, polyolefins, preferably polyethylenes, are used as heat sealing layers but also other thermoplastics may be used.

Adhesive layers serve to provide adhesion between the substrate and a coating layer or between two coating layers. Ethylene acrylic acid (EAA) or ethylene-methacrylic acid-EMAA ((meth)acrylic acid-polyolefin copolymers)is commonly used as such an adhesive layer. Such adhesive polymers may also be used as heat sealing layers.

Gas barrier layers are used to reduce the permeation of undesired gases and vapours through the packaging laminate. Water vapour and oxygen are the principal interception targets for such gas barrier layers in food, pharmaceutical and cosmetic packaging, but other gases or vapours may also be interception targets for such layers. Materials which may be applied wet and dried to form gas barrier layers include polyvinyl alcohol (PVOH), ethylene vinyl alcohol (EVOH) and starch.

Distancing layers serve to reduce the partial pressure of oxygen between two layers separated by the distancing layer. Thus, the rate of diffusion of oxygen through the further layer is reduced.

Oxygen scavenging layers contain oxygen scavenging substances that react with oxygen to prevent it penetrating further through the laminate. For instance, ascorbic acid may be incorporated into such a layer as an active oxygen scavenger. Other oxygen scavengers include vitamin E, iron, and $Fe^{2+}$.

Heat sealing layers facilitate the sealing together of the same or opposite surfaces of the laminate by heat sealing to enable rigid or deformable packages to be produced.

Preferably, at least one of said wet coating layers is a gas barrier layer comprising a polymer containing a dispersion of laminar nanoparticles. Preferably, said nanoparticles are of an exfoliated inorganic laminar compound. Such nanoparticles and their use in forming gas barrier layers have been extensively discussed in the literature, including EP-A-0590263 and Zilg et al (1).

Preferably, said wet coating layers are applied using a slide coater or a curtain coater. These two different forms of coating machine are described in Cohen et al (2). Briefly, in the slide (or cascade) coater, coating fluids are pumped up through channels onto an inclined plane to flow down to a sharp edge at the end of the plane. A web to be coated runs adjacent said edge around a coating roll and the layers of coating material flow across the gap between the edge of the plane and the web to coat the web. The different fluid layers do not mix but flow one over the other. In a curtain coater, fluid layers are formed in the same way but the web does not run adjacent the edge of the inclined plane. Instead, the flowing layers run over the edge of the plane and fall in a curtain onto a horizontally running web which runs beneath the bottom edge of the plate.

The viscosity of the fluid layers may be controlled as known in the art of premetered coating to maintain and optimise performance. Generally, in slide coating the bottom layer should have a low viscosity, preferably of 50 mPas or less, more preferably 5–10 mPas. For each higher layer, the viscosity should increase a little, but on the other hand the surface energy should decrease. Surfactants may be used as required as similarly known in the art, particularly when using curtain coating.

As known in the slide coater art, a slight under-pressure may be applied beneath the die (i.e. the edge of the inclined plane) pulling the films down against the web surface. This may be created by small fans close to the coating die and the web roll.

Preferably, the substrate is paper, paperboard, or plastics film, each optionally already bearing one or more coating layers. Such earlier formed coating layers may either be formed in a separate wet coating and drying operation or may be formed by hot lamination techniques such as melt extrusion and extrusion lamination. The prior application of a layer by wet coating and drying is generally not advantageous because of the risk of damage to the substrate (less likely when the substrate is relatively thick, e.g. paperboard) or of forming drying cracks. Where the substrate is a thin paper or plastics film, it is preferably not previously wet coated, so that it is subjected only once to the stress of a drying operation.

The invention includes a method as described above further comprising applying one or more coating layers over the dried layers. Again, such subsequently applied layers may be formed in a separate wet coating and drying operation or may be formed by hot lamination techniques such as melt extrusion and extrusion lamination. For instance, polyethylene heat sealing layers may be provided over the wet applied layers in a conventional manner.

The total wet thickness of the layers applied by the coating method described is preferably approximately 50 $\mu$m. Below 45 $\mu$m it is difficult to operate the coating equipment correctly. For the range of solids contents preferably used for this invention, i.e. between about 5 and 25%, high total thicknesses may be more difficult to dry and require more sophisticated drying equipment. Generally, therefore, it is desirable that the aggregate thickness (wet) of the simultaneously coated layers should be in the range of 45μm to 100μm, more preferably 45 to 60 or 45 to 55 μm.

Within this aggregate thickness, the thickness of individual layers may be freely chosen.

Preferably, at least one layer is of no more than 20 μm wet thickness. At least one layer may, more preferably, be in the range of 2 to 10 μm wet thickness.

Preferably, the most expensive material will be coated in such a thin layer.

This is in contrast to the traditional application of successive wet layers which are individually dried, where each layer needs to be of 30 to 40 μm at least for proper application.

The substrate may be such as to give packages formed from the laminate shape integrity, such as paper or paperboard packages, or may be such to produce flexible laminates for making pouches or bags or for use as wrapping films. According to a preferred embodiment of the invention, thin paper or film carrier substrates may be used as described in WO-A-99/46121, for further incorporation into a paperboard packaging laminate.

The invention includes a multi-layer packaging laminate formed by a method as claimed in any one of claims 1 to 7, comprising at least one layer having a wet thickness of no more than 20 μm and (1) at least one layer having oxygen barrier properties such that the oxygen transmission of the laminate is no more than 150 cm$^3$/m$^2$, per 24 h,(23° C., 83% RH) at 1 atm; or (2) at least one oxygen scavenging layer.

Preferably, the oxygen transmission is no more than 50 cm$^3$/m$^2$ under the above conditions. More preferably the oxygen transmission is no more than 20, more preferably no more than 10 and most preferably no more than 1 cm$^3$/m$^2$.

Methods according to the invention may further comprise forming a package from said packaging material and may further comprise other steps such as filling said package and closing said package.

Packages made in accordance with the invention may be used for packing food or drink products including milk and fruit juice (including fresh citrus juice for chilled or aseptic ambient storage) or in any of the wide variety of known uses for packaging laminates.

BRIEF DESCRIPTION OF THE DRAWINGS

The invention will be further illustrated by the following description of preferred embodiments with reference to the accompanying drawings in which.

DETAILED DESCRIPTION OF THE INVENTION

Figure 1:
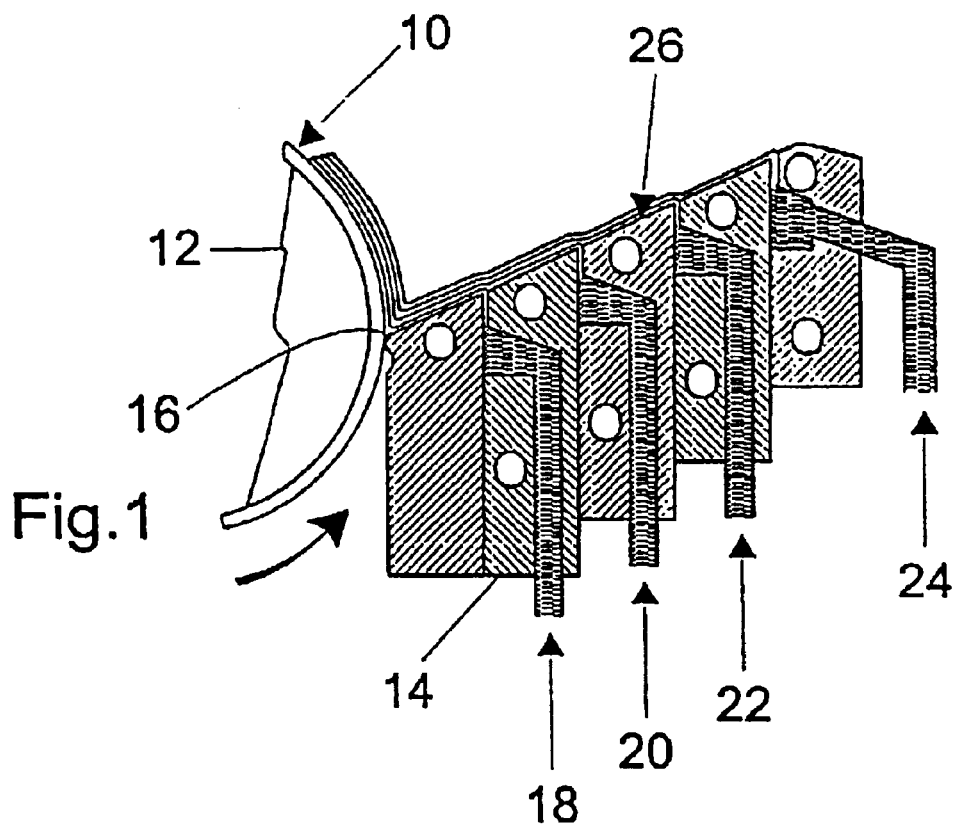
FIG. 1 shows the coating of a web using a slide coater.

As shown in FIG. 1, a packaging laminate substrate web 10 such as paperboard is advanced anti-clockwise carried on a coating roll 12 positioned adjacent a slide block 14 having an upper, inclined plane face 26 ending at its lower end at an edge 16 spaced by a gap from the web 10.

The block 14 has four channels 18, 20, 22, 24 leading to respective slot openings in the inclined plane face 26 for the feeding of four streams of coating material. More or fewer channels and slot openings may be provided. Coating liquids fed there through flow over the plane 26 one upon another without mixing and pass over the gap at the edge 16 to coat the web. The web then passes to a drier (not shown).

Figure 2:
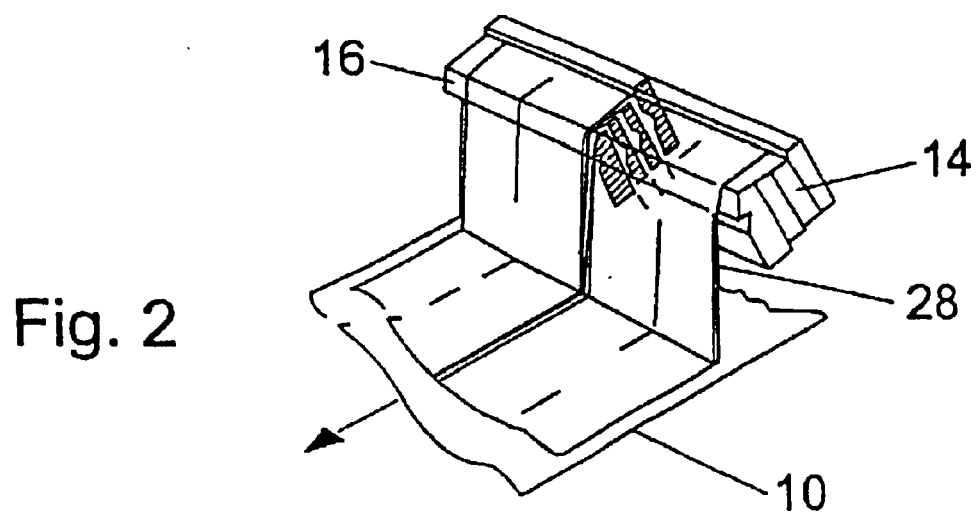
FIG. 2 shows the coating of a web using a curtain coater.

In FIG. 2, a packaging laminate substrate web 10 such as paperboard is advanced from right to left horizontally. A curtain 28 of coating materials falls from the edge 16 of a block 14 similar to that shown in FIG. 1. The superposed flows of coating liquids flow down the inclined face of the block 14 to the edge 16 from which they fall as the curtain 28 to the web 10. The web then passes to a drier (not shown).

By way of example, the invention includes a packaging laminate comprising a substrate such as paperboard bearing on one side any one of the following patterns of layers applied wet in one operation or in several:

/adh/PVOH/dist/PVOH/adh/
/adh/nano/dist/nano/adh/
/adh/nano/dist/nano/eater/adh/
/adh/PVOH/nano/dist/nano/PVOH/adh/
/adh/PVOH/nano/dist/nano/PVOH/eater/adh/ where:

PVOH=a gas barrier layer of PVOH, which may include a minor amount of an additional polymer, such as preferably EAA adh=adhesive layer nano=a carrier polymer containing nanoparticles eater=a carrier polymer containing an oxygen scavenger dist=a distancing layer More specifically, such applied layers may include the sequence:

/EAA/PVOH+nanoparticles/PVOH+EAA/PVOH+nanoparticles/EAA/

Referenes

1. C. Zilg, P. Reichert, F. Dietsche.' T. Engelhardt and R. Muelhaupt, "Plastics and Rubber Nanocomposites based upon Layered Silicates" Plastics Technology 2000, Kunstoffe Plast Europe October 1988.

2. E. Cohen and E. Gutoff, "Modern Coating and Drying Technology" pp. 117–122, published by VCH.

What is claimed is:

1. A method of producing a multi-layer packaging laminate comprising a substrate bearing at least two superposed coating layers, wherein the substrate is paper or paperboard and the method comprises applying wet coating layers to said substrate to provide wet superposed layers thereon and drying said layers, the wet coating layers include, in the following order, (i) ethylene acrylic acid, (ii) polyvinyl alcohol and nanoparticles, (iii) ethylene acrylic acid and polvyinyl alcohol, (iv) polyvinyl alcohol and nanoparticles and (v) ethylene acrylic acid.

2. A method as claimed in claim 1, wherein said nanoparticles are a dispersion of laminar nanoparticles.

3. A method as claimed in claim 2, wherein said nanoparticles are of an exfoliated inorganic laminar compound.

4. A method as claimed in claim 1, wherein said wet coating layers are applied using a slide coater or a curtain coater.

5. A method as claimed in claim 1, wherein the paper or paperboard optionally already bears one or more coating layers.

6. A method as claimed in claim 1, further comprising applying one or more coating layers over the dried layers.

7. A method as claimed in claim 1, further comprising forming a package from said packaging material.

8. A method as claimed in claim 7, further comprising filling said package.

9. A multi-layer packaging laminate formed by a method as claimed in claim 1, comprising at least one layer having a wet thickness of no more than 20 μm and at least one layer having oxygen barrier properties such that the oxygen transmission of the laminate is no more than 150 cm$^3$/m$^2$, per 24 h, (23° C., 83% RH) at 1 atm; or at least one oxygen scavenging layer.

10. A laminate as claimed in claim 9, having an oxygen transmission of no more than 50 cm$^3$/m$^2$ at 24 h, 1 atm (23° C., 83% RH).

11. A laminate as claimed in claim 10, wherein the oxygen transmission is no more than 20 cm$^3$/m$^2$ at 24 h, 1 atm (23° C., 83% RH).

12. A method of producing a multi-layer packaging laminate comprising a substrate bearing at least two superposed coating layers, wherein the method comprises:

applying five or more wet coating layers to said substrate to provide wet superposed layers thereon, herein the substrate is paper or paperboard and the wet coating layers include, in the following order, (i) ethylene acrylic acid, (ii) polvinyl alcohol and nanoparticles, (iii) ethylene acrylic acid and polyvinyl alcohol, (iv) polyvinyl alcohol and nanoparticles and (v) ethylene acrylic acid; and drying said layers, wherein the wet coating layers are in solution or dispersed in a carrier liquid and at least one of the wet superposed layers has a thickness of no more than 20 μm.

* * * * *